United States Patent Office 2,886,609
Patented May 12, 1959

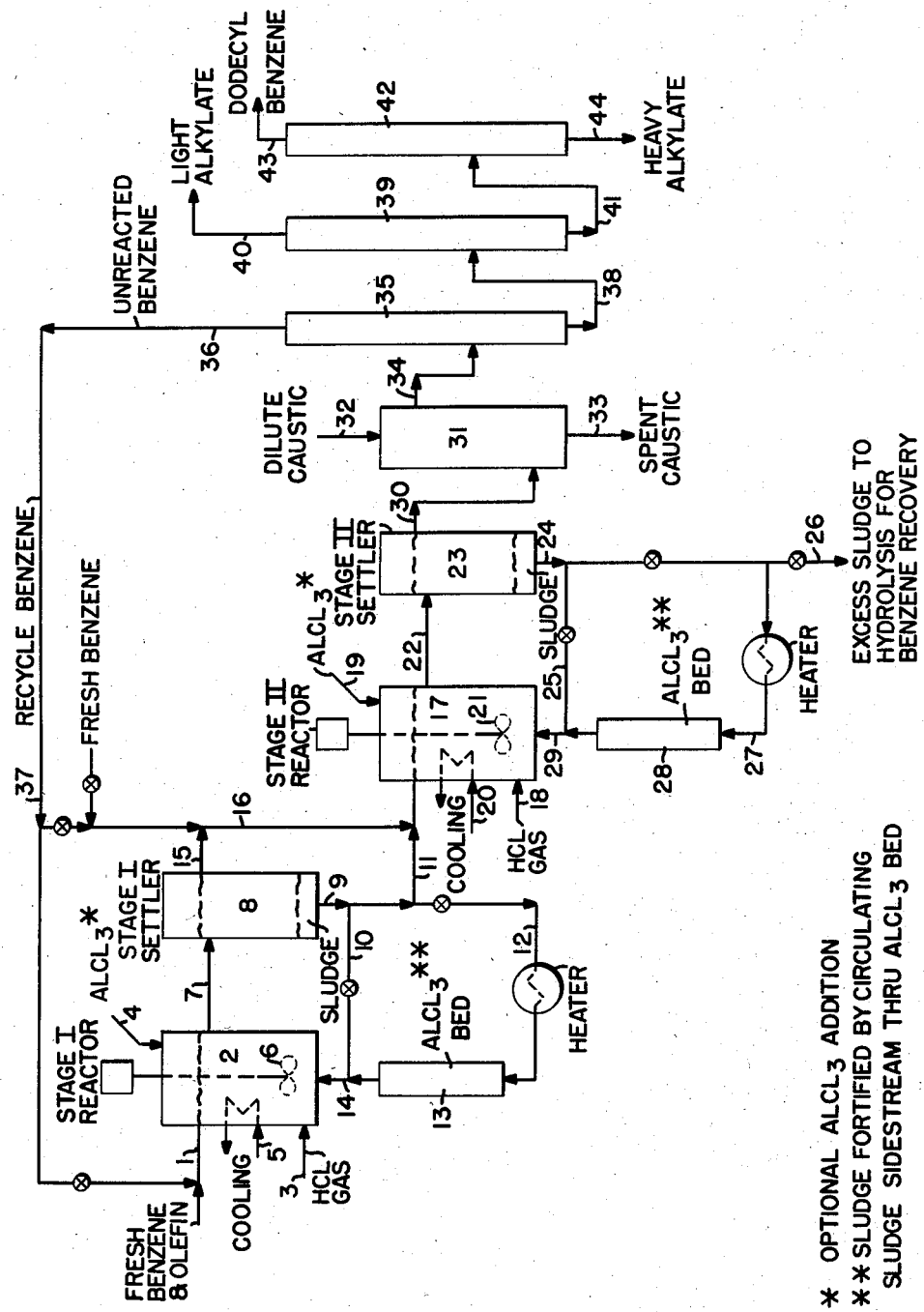

2,886,609

PROCESS FOR PRODUCING HEAVY ALKYLATE SULFONATION FEEDSTOCKS

Thomas H. Hakala, Union, N.J., assignor to Esso Research and Engineering Company, a corporation of Delaware Application December 26, 1957, Serial No. 705,336

17 Claims. (Cl. 260—671)

This invention relates to an improved two stage process for the alkylation of aromatic hydrocarbons with olefins using a Friedel-Crafts type catalyst.

Alkylation reactions for producing alkylated aromatic hydrocarbons which are suitable for preparing water-soluble and oil-soluble sulfonate detergents are well known. These reactions comprise reacting an aromatic hydrocarbon having a replaceable nuclear hydrogen atom with an olefin-acting compound under conditions of temperature, pressure, time, etc., referred to as alkylation conditions, so as to replace the said hydrogen atom with an alkyl group of suitable chain length.

Particularly, this invention relates to flexibility improvements in the $AlCl_3$—HCl catalyzed addition of tetrapropylene to benzene so as to maximize either detergent alkylate or heavy alkylate as desired. One advantage of the process is that it permits rapid modification allowing a preferential shift from the manufacture of one normal component of the reaction to another by merely changing the operating conditions with no changes in apparatus.

The term "heavy alkylate" is used herein to designate an alkylated aromatic hydrocarbon distilling above about 320° C. The term "detergent alkylate" is used herein to designate an alkylated aromatic hydrocarbon distilling between about 270 and 320° C. The term "light alkylate" is used herein to designate an alkylated aromatic hydrocarbon distilling below about 270° C.

The industrial demand for oil-soluble sulfonates is increasing every year. Synthetic sulfonates of this type are prepared by sulfonating the heavy alkylates. One of the principal feed stocks for these synthetic sulfonates is the bottoms produced in the manufacture of detergent alkylate by $AlCl_3$—HCl catalyzed addition of tetrapropylene to benzene. Polymers of normal butenes and their copolymers with propylene are also used as the olefin source.

It is the two-fold object of this invention to provide a process which will, when desired, maximize the production of heavy alkylate and which can be modified with minimum difficulty, when more detergent alkylate is required.

In a conventional single stage process for the alkylation of benzene by tetrapropylene designed to maximize detergent alkylate the following ranges of reactants and catalyst ratios are typical.

Benzene to olefin vol. ratio _____ 4:1 to 14:1
HCl, wt. percent on olefin _____ 0.2 to 1.0
$AlCl_3$, wt. percent on olefin _____ 2.0 to 9.0

The resulting alkylate yields based in volume % based on olefin feed from such a process fall within the following range.

| Light Alkylate | Detergent Alkylate | Heavy Alkylate |
|---|---|---|
| 15-30 | 70-90 | 10-25 |

Attempting to increase the yield of heavy alkylate by modifying the benzene to olefin ratio and catalyst concentrations revealed the following.

(1) Alkylate yields and polymer content vary markedly with benzene/tetramer ratio at low HCl rates. However, at higher HCl rates there is less variation. Illustrative data are presented in the following table:

VARIATION OF ALKYLATE YIELDS WITH BENZENE TETRAMER RATIO AND HCl RATES

[4-8 weight percent $AlCl_3$ on tetramer. 12-14° C., 22 min. residence time.]

| Benzene/Olefin Feed Vol. Ratio | HCl Wt. Percent on Olefin | Alkylate Yields, volume Percent on Olefin Feed | | | |
|---|---|---|---|---|---|
| | | Light Alkylate | Detergent Alkylate Cut | | Detergent Alkylate Bottoms [b] | |
| | | | Yield | Br. No. | Yield | Br. No. |
| 2/1 | 0.2 | 57 | 10 | 24 | 28 | 39 |
| 5/1 | 0.2 | 21 | 87 | 0.5 | 16 | 0.2 |
| 2/1 | 0.8-0.9 | 18 | 81 | 0.2 | 20 | 0.4 |
| 3/1 | 0.8-0.9 | 19 | 85 | 0.4 | 18 | 0.7 |
| 5/1 | 0.8-0.9 | 21 | 85 | 0.1 | 15 | 0.1 |
| 14/1 [a] | 0.5 | 23 | 85 | 0.3 | 11 | 0.3 |

[a] 10 weight percent $AlCl_3$ on olefin.
[b] Heavy alkylate as defined hereinbefore and olefin polymer distilling in the same range.

(2) At low HCl rates and low (2/1) benzene/tetramer ratio polymerization is a substantial part of the reaction as shown by high bromine numbers in the products.

EFFECT OF HCl RATE ON POLYMERIZATION AT LOW BENZENE/OLEFIN FEED RATIOS

[2/1 volume feed ratio, benzene/tetramer, 4 wt. percent $AlCl_3$. 12-14° C., 22 min. residence time.]

| HCl Rate, Wt. Percent on Olefin | Olefin Conversion, Percent | Alkylate Yields, volume Percent on Olefin Feed | | | |
|---|---|---|---|---|---|
| | | Light Alkylate [a] | Detergent Alkylate | | Heavy Alkylate | |
| | | | Yield | Br. No. | Yield | Br. No. |
| 0.1 | 43 | 10 | 9 | 22 | 26 | 42 |
| 0.2 | 67 | 21 | 12 | 15 | 29 | 26 |
| | 62 | 20 | 10 | 19 | 27 | 30 |
| | 61 | 18 | 10 | 24 | 28 | 39 |
| 0.4 | 99+ | 17 | 83 | 0.1 | 21 | 0.1 |
| | 99+ | 16 | 83 | 1.0 | 21 | 0.1 |
| | 99+ | 17 | 80 | 0.1 | 22 | 0.2 |
| 0.7 | 99+ | 16 | 83 | 0.4 | 21 | 0.7 |
| | 99 | 16 | 84 | 0.4 | 21 | 0.5 |
| | 99+ | 17 | 84 | 0.1 | 22 | 0.7 |
| | 99+ | 18 | 81 | 0.1 | 20 | 0.4 |
| 1.6 | 99+ | 16 | 84 | 0.7 | 19 | 0.7 |

[a] Corrected for unconverted olefin.

(3) That increasing the reaction temperature within operable limits has little effect on the bottoms yield at the 5/1 benzene to olefin ratio but reduces the yield at lower ratios.

(4) That varying the $AlCl_3$ concentration within operable limits does not affect heavy alkylate production but is a critical operating variable with respect to light alkylate and detergent alkylate yields.

Unconverted olefin polymer in alkylate bottoms as evidenced by high bromine numbers produces upon sulfonation bodies which are insoluble in oil. Therefore any process designed to maximize heavy alkylate for use in making oil soluble sulfonates defeats itself if at the same time the percentage of olefin polymer within its boiling range is not held to a minimum.

To combine those features of the foregoing data which tend to maximize heavy alkylate production with those which tend to hold the percentage of unconverted olefin boiling in the same range to a minimum in a single stage reaction leads to one of the following results:

(1) If a high olefin conversion is achieved by using a high HCl rate with a low benzene/olefin ratio the yield of heavy alkylate is not materially increased over the conventional detergent alkylate process.

(2) If a high yield of detergent alkylate bottoms (heavy alkylate and olefin polymer distilling in the same range) is achieved by using a low benzene/olefin ratio with a low HCl rate a low olefin conversion results and the product is unsuitable for producing oil soluble sulfonates.

(3) If a high benzene/olefin ratio is used, the HCl rate affects only the degree of olefin conversion and has little or no effect on the yield.

Thus, the most useful end that can be achieved toward maximizing the yield of heavy alkylate in a one stage reaction is to create an intermediate product suitable for further alkylation by effecting principally olefin polymerization in the presence of aromatics. The presence of aromatics is advantageous in the polymerization of olefins when such polymers are to be converted into alkylates suitable for making oil-soluble sulfonates in that they tend to promote the formation of an active alkylation sludge catalytic complex. In the absence of aromatics this reaction tends to produce polymers of a molecular weight too high to be suitable for alkylates of this type.

It has now been discovered that the problem of maximizing the production of heavy alkylate suitable for producing oil soluble sulfonates can be achieved by resorting to a novel two stage process. In this process a low benzene/olefin ratio and a low HCl rate are employed in the first stage so that polymerization of the olefin feed is a substantial part of the reaction. The first stage product is then fed to a second stage where the same or a higher benzene/olefin ratio and a higher HCl rate are employed so that alkylation of the aromatic is the principal reaction. The heavy alkylate product produced in this manner is primarily mono-alkylated benzenes. This type of alkylated benzene sulfonates readily to produce sulfonic acids suitable for conversion to oil soluble sulfonates. In the accompanying drawing, a diagrammatic side elevation not drawn to scale, a preferred embodiment of the invention and the manner of its operation are illustrated. Referring to the drawing, fresh benzene and olefin concentrate comprising high molecular weight straight and branch chain olefins of at least 6 and not more than 21 carbon atoms to the molecule, preferably propylene tetramer, are passed through line 1 to a stage I reactor 2. HCl gas is introduced into 2 near the bottom through line 3 while solid powdered AlCl₃ may be added at the top through line 4. The stage I reactor 2 is also equipped with a cooling unit 5 and an agitator 6, or other mixing means. The feed stream may be diluted with additional benzene from line 37 to provide the desired volume ratio of benzene to olefin. The first stage reactor effluent is passed through line 7 into the stage I settler 8 where the catalyst separates by gravity. Excess catalyst sludge is removed via line 9. A portion of this stream may be recycled to the first stage reactor through line 10 or passed to the stage II reactor 17 through line 11, and the remainder may be passed to the first stage catalyst bed 13 via line 12. Catalyst sludge fortified by circulating through said catalyst bed 13 is returned to the stage I reactor 2 through line 14. This sludge sidestream is the principal AlCl₃ source particularly when the reaction is carried on above atmospheric pressure.

The hydrocarbon phase from settler 8 and a portion of the catalyst phase is passed through line 15 into line 16 where the second stage feed may be diluted with additional benzene before passing into the stage II reactor 17 via line 11. The stage II reactor 17 is designed to be identical in construction to the stage I reactor 2 with HCl being introduced via line 18, AlCl₃ entering through line 19 and having included a cooling unit 20 and an agitator 21. The second stage reactor effluent is passed through line 22 into a second stage settler 23 where again the catalyst separates by gravity. The catalyst phase is removed via line 24. A portion of this stream may be recycled to the second stage reactor through line 25, excess sludge may be passed off via line 26 to hydrolysis for benzene recovery, and the remainder may be passed to the second stage catalyst bed 28 via line 27. Catalyst sludge fortified by circulating through the catalyst bed 28 is returned to the stage II reactor via line 29. The hydrocarbon phase from settler 23 is passed via line 30 to a neutralization chamber into which a dilute caustic, preferably dilute sodium hydroxide is introduced via line 32. Spent caustic is removed via line 33 and the hydrocarbon phase passes via line 34 into fractional distillation zone 35 where unconverted benzene is separated and recycled from the top of zone 35 through lines 36, 37, 16 and 1 to reaction zones 2 and 17. The bottoms product from zone 35 passes via line 38 into fractional distillation zone 39 where light alkylate distilling above about 270° C. is taken over via line 40 and if desired may be recycled via lines 37, 16 and 1 to reaction zones 2 and 17. The bottoms product from zone 39 passes via line 41 to fractional distillation zone 42 where detergent alkylate distilling between about 270 and 320° C. is taken over via line 43 and heavy alkylate distilling above about 320° C. is removed as bottoms via line 44.

By properly regulating the conditions in the two reaction zones the relative proportions of light, detergent and heavy alkylates present in the final product can be controlled. In the embodiment wherein heavy alkylate is to be maximized the following conditions are employed. In the first reaction stage the volume ratio of benzene to olefin should be maintained in the range of 0.5:1 to 3.0:1. Optimum operation conditions for this stage comprise the use of temperatures in the range of 0 to 50° C., more preferably 10–20° C., and pressures of 1 to 50, more preferably 1–5, atmospheres. The HCl rate is kept at a low level in the range of 0.05 to 0.25 wt. percent and the other catalytic component, AlCl₃ is preferably employed in the range of 2 to 5 wt. percent based on olefin feed. The residence time should be within the range of 0.1 to 1.0 hour. The sludge volume in the reactor is maintained at 10 to 50 vol. percent based on reactor capacity.

In the second stage the volume ratio of benzene to olefin should be maintained in the range of 2:1 to 14:1, more preferably 2:1 to 5:1. The temperature, pressure, residence time, sludge volume used is the same as in the first stage reactor. The HCl rate is increased in the second stage so that the total HCl present in the second stage is between 0.4 to 2.0 wt. percent based on olefin, and the AlCl₃ rate is increased in the second stage so that the total AlCl₃ present in the second stage is between 4 and 10 wt. percent.

Olefin polymers suitable for use as feeds for this process may be obtained from a process as described in U.S. Patents 2,486,533 and 2,695,326 both of which deal with polymers of $C_3$ to $C_4$ normal olefins herein termed "U.O.P. type polymers." Such polymers having between 6 and 21 carbon atoms may be used but a $C_{10}$ to $C_{13}$ cut which is predominantly $C_{12}$ is preferred. More specifically the polymers of butene 1 and butene 2 and their copolymers with propylene in addition to homopolymers of propylene, e.g. tripropylene and tetrapropylene are preferred. Of these tetrapropylene is most preferred. A slightly higher yield of heavy alkylate may be obtained with tripropylene but this advantage over tetrapropylene is overcome by the fact that when tripropylene is used a considerable quantity of nonyl benzene is also produced for which there is little known use.

The aromatics may be either benzene, toluene or short chain alkyl substituted benzenes in which the short chain alkyl group contains up to 4 carbon atoms. However, benzene is clearly to be preferred. It is preferred to carry out this process in a continuous manner as shown in the accompanying drawing wherein two reaction zones are connected in a series. The design of such zones being identical this invention may be carried out in a batch or block type operation as when only single zone reactor apparatus is available.

In the embodiment of this invention wherein it is desired to maximize the production of detergent alkylate it is merely necessary to change the benzene/olefin ratio and $AlCl_3$—HCl rates to conform to the ratios of conventional practice. This conversion can be accomplished without any apparatus change or interruption of operation. However, if desired, this embodiment may also be carried out as a batch type operation.

As a guide in carrying out the invention, the following example may be helpful, it being understood that this example is illustrative rather than limitative.

EXAMPLE I

The invention was tested as a continuous operation at atmospheric pressure employing glass reactor zones of 1.2 liter capacity. In these experiments, the aromatic hydrocarbon employed was benzene while the olefin source used was a tetrapropylene fraction of U.O.P. type olefin polymer. Analysis of the olefin feed revealed the following:

Bromine No., cg. $Br_2/g$ _____ 86.3
Distillation, vol. percent distilled, V.S.B.P., °C.:
  I.B.P. _____ 180
  2% _____ 180
  5% _____ 183
  10% _____ 186
  20% _____ 189
  30% _____ 192
  40% _____ 193
  50% _____ 194
  60% _____ 197
  70% _____ 197
  80% _____ 200
  90% _____ 203
  95% _____ 216
  98% _____ 230
  100% _____ 238

In carrying out these tests the results of which are set forth in Table I a hydrocarbon feed having a 2:1 benzene to olefin ratio was continuously introduced into a first stage 1.2 liter glass reactor vessel with a mechanical mixer. $AlCl_3$ at the rate of 2.3 to 3.0 grams per 100 grams of olefin and HCl gas at the rate of 0.17 to 0.18 gram per 100 grams of olefin was fed continuously. The mixture was mechanically mixed and remained in the first stage reactor for an average residence time of between 18 to 22 minutes. The first stage liquid effluent was then introduced continuously into a second stage glass reactor vessel of the same capacity and the HCl gas rate was increased to between 0.96 and 1.1 grams per 100 grams of olefin under good mixing conditions. The average residence time in the stage two reactor was also between 18 and 22 minutes. The second stage product effluent was withdrawn continuously and the hydrocarbon phase then separated from the second stage catalyst sludge product by gravity and washed with a dilute sodium hydroxide solution. The washed product was separated by fractional distillation and tested for unsaturation by bromine number.

Table I

| Hydrocarbon Feed | 1 | 2 | 3 |
|---|---|---|---|
| Olefin Source | $C_{12}$ | $C_{12}$ | $C_{12}$ |
| Composition, Benzene, Olefin Volume Ratio | 2.00/1.00 | 2.00/1.00 | 2.00/1.00 |
| Residence Time in Minutes: | | | |
|  Stage I | 21 | 19 | 21 |
|  Stage II | 21 | 18 | 22 |
| $AlCl_3$ Feed, g./100 g. Olefin (a): | | | |
|  Stage I | 2.3 | 3.0 | 2.3 |
|  Stage II | 2.3 | 3.0 | 2.3 |
| HCl Feed, g./100 g. Olefin (b): | | | |
|  Stage I | 0.17 | 0.14 | 0.18 |
|  Stage II | 1.1 | 0.96 | 1.0 |
| Reactor Temperature, °C.: | | | |
|  Stage I | 12–14 | 12–13 | 22–23 |
|  Stage II | 12–14 | 12–13 | 13–14 |
| Olefin Conversion, Percent (c) | 99.9+ | 99.9+ | 99.9+ |
| Yields, Vol. Percent on Olefin Feed (c): | | | |
|  Light Alkylate | 23.6 | 24.5 | 23.7 |
|  Detergent Alkylate | 55.1 | 53.1 | 58.4 |
|  Heavy Alkylate | 37.2 | 36.4 | 35.6 |
| Bromine No. of Alkylates, cg. $Br_2/g$.: | | | |
|  Detergent Alkylate | 0.66 | 0.43 | 0.58 |
|  Heavy Alkylate | 0.66 | 0.46 | 0.46 | a The total of $AlCl_3$ present in the second stage is the sum of that added in Stages I and II.
b The total of HCl present in the second stage is the sum of that added in Stages I and II.
c Based on workup of washed hydrocarbon phase product.

EXAMPLE II

Heavy alkylate prepared by the process of this invention as previously set forth in detail was tested and compared with heavy alkylate from a conventional one stage process.

In the conventional process a 5/1 benzene to olefin ratio was employed with 5 wt. percent $AlCl_3$ and 1 wt. percent HCl both based on olefin feed.

In the two stage process of this invention, a 2/1 benzene to olefin ratio was employed in each stage and 2.3 wt. percent $AlCl_3$ based on olefin was employed in each stage. HCl in the amount of 0.15 wt. percent based on olefin was employed in the first stage and 1.0 wt. percent in the second.

The olefin feed in each test was propylene tetramer and the same temperature, i.e. 12–13° C. was used in each test.

In both tests the heavy alkylate was topped and an attempt was made to sulfonate that portion of the heavy alkylate having a boiling point above 337° C.

The results obtained showed that in each test the percentage of alkylate that could be sulfonated fell within the range of 81 to 92 vol. percent based on olefin feed. The total yield of heavy alkylate in the two stage process of this invention was more than twice as high as that of the control. Therefore, the total amount of sulfonatable heavy alkylate produced in the two stage operation was approximately twice that produced by the control.

To obtain a product which is essentially free of oil-insoluble sulfonates, typical conventional detergent alkylate bottoms must be topped to reject the lowest boiling 25–30% of said bottoms. The heavy alkylates produced by this process should be treated in a similar manner for the best results.

The terms "propylene tetramer," "tetrapropylene" and "tetrapropylene fraction" are used herein to mean propylene polymer having 12 carbon atoms to the molecule and polymer fractions consisting predominantly of propylene polymers having 12 carbon atoms to the molecule respectively.

The term "tripropylene" is used herein to mean propylene polymer having 9 carbon atoms to the molecule.

To recapitulate briefly, this invention provides a flexible two stage process for the $AlCl_3$—HCl catalyst addition of tetrapropylene to benzene allowing a preferential shift to maximize either detergent alkylate or heavy alkylate as desired by merely changing the operating conditions with no changes in apparatus. The embodiment designed to maximize heavy alkylate approximately doubles the yield of that product over conventional practice.

What is claimed is:

1. A two stage alkylation process for $AlCl_3$—HCl catalyzed addition of $C_6$ to $C_{21}$ olefinic polymer obtained from a $C_3$ to $C_4$ normal olefin and higher polymers derived therefrom to an aromatic hydrocarbon selected from the group consisting of benzene, toluene and short chain alkyl substituted benzenes in which the short chain alkyl group contains up to 4 carbon atoms, the improvement which comprises in a first stage reacting said $C_6$ to $C_{21}$ olefinic polymer in the presence of said aromatic hydrocarbon and an $AlCl_3$ catalyst using HCl as a reaction promoter in the range of 0.05 to 0.25 wt. percent based on olefinic polymer feed to promote formation of higher molecular weight polymers of said olefinic polymer and depress alkylation addition of said olefinic polymer to said aromatic hydrocarbon, then in a second stage reacting the resulting product with $AlCl_3$ and an increased amount of HCl sufficient to promote alkylation of said aromatic hydrocarbon by said higher molecular weight polymers.

2. A process in accordance with claim 1 in which said olefinic polymer has 10 to 13 carbon atoms per molecule.

3. A process in accordance with claim 1 in which said olefinic polymer is tetrapropylene.

4. A process in accordance with claim 1 in which said aromatic hydrocarbon is benzene and said benzene is alkylated in the second stage by the higher molecular weight polymers to form heavy alkylate boiling above 320° C.

5. A two stage alkylation process designed to maximize the production of heavy alkylate distilling above about 320° C. in an $AlCl_3$—HCl catalyzed addition of a $C_6$ to $C_{21}$ olefinic polymer obtained from a $C_3$-$C_4$ normal olefin and higher polymers derived therefrom to an aromatic hydrocarbon selected from the groups consisting of benzene, toluene and short chain alkyl substituted benzenes in which the short chain alkyl group contains up to 4 carbon atoms, which comprises first reacting said $C_6$ to $C_{21}$ olefinic polymer in the presence of said aromatic hydrocarbon in a first stage wherein the aromatic to polymer volume ratio is maintained in the range of 0.5:1 to 2.0:1 in the presence of $AlCl_3$ employed in the range of 2 to 5 wt. percent based on olefinic polymer feed with HCl gas being employed as a reaction promoter in the range of 0.05 to 0.25 wt. percent based on olefinic polymer feed for a period of time in the range of 0.1 to 1.0 hour to promote the formation of higher molecular weight polymers of said olefinic polymer and depress alkylation addition of said olefinic polymer to said aromatic hydrocarbon then reacting the resulting product in a second stage with additional HCl gas and $AlCl_3$ so that the total of HCl gas employed in said second stage is in the range of 0.4 to 2.0 wt. percent based on said olefinic polymer and the total of $AlCl_3$ employed in said second stage is in the range of 4 to 10 wt. percent based on said olefinic polymer for a period of time in the range of 0.1 to 1.0 hour to promote alkylation of said aromatic hydrocarbon by said higher molecular weight polymers.

6. A process according to claim 5 in which said olefinic polymer has 10 to 13 carbons per molecule.

7. A process according to claim 5 in which said aromatic hydrocarbon is benzene.

8. A process according to claim 5 in which said period of time is within the range of 0.25 to 0.4 hour.

9. In an alkylation process for $AlCl_3$—HCl catalyzed addition of a $C_6$ to $C_{21}$ olefinic polymer obtained from a $C_3$-$C_4$ normal olefin and higher polymers derived therefrom to an aromatic hydrocarbon selected from the group consisting of benzene, toluene and short chain alkyl substituted benzenes in which the short chain alkyl group contains up to 4 carbon atoms in the presence of $AlCl_3$, and HCl gas the improvement in which comprises varying the amount of HCl gas employed in the range of 0.05 to 2.0 wt. percent based on said olefinic polymer feed, the amount of $AlCl_3$ in the range of 2 to 10 wt. percent based on said olefinic polymer feed and the volume ratio of said aromatic hydrocarbon to said olefinic polymer in the range of 0.5:1 to 14:1 so as to preferentially produce higher olefinic polymers and alkylated aromatic hydrocarbon distilling above about 320° C., the HCl gas, aromatic hydrocarbon, and $AlCl_3$ being added in incremental amounts to a reaction mixture containing said olefinic polymer and polymers derived therefrom.

10. A two stage alkylation process for $AlCl_3$—HCl catalyzed addition of $C_6$ to $C_{21}$ olefinic polymer obtained from a $C_3$-$C_4$ normal olefin and higher polymers derived therefrom to an aromatic hydrocarbon selected from the group consisting of benzene, toluene and short chain alkyl substituted benzenes in which the short chain alkyl group contains up to 4 carbon atoms, the improvement in which comprises first reacting said $C_6$ to $C_{21}$ olefinic polymer in the presence of said aromatic hydrocarbon in a first stage wherein the aromatic to polymer volume ratio is maintained in the range of 0.5:1 to 2.0:1 in the presence of $AlCl_3$ employed in the range of 2 to 5 wt. percent based on olefinic polymer feed with HCl gas being employed as a reaction promoter in the range of 0.05 to 0.25 wt. percent based on olefinic polymer feed for a period of time in the range of 0.1 to 1.0 hour to promote the formation of higher molecular weight polymers of said olefinic polymer and depress alkylation addition of said olefinic polymer to said aromatic hydrocarbon, then reacting the resulting product in a second stage with an additional amount of said aromatic hydrocarbon, an additional amount of $AlCl_3$ and an additional amount of said HCl gas so as to maintain an aromatic to polymer volume ratio in the second stage of 2.0:1 to 14.0:1, an $AlCl_3$ total content in the second stage in the range of 4 to 10 wt. percent based on said olefinic polymer feed and a HCl gas total content in the second stage in the range of 0.4 to 2.0 wt. percent, based on said olefinic polymer feed, for a period of time in the range of 0.1 to 1.0 hour to promote further alkylation of said aromatic hydrocarbon.

11. A process according to claim 10 in which said olefinic polymer has 10 to 13 carbon atoms per molecule.

12. A process according to claim 10 in which said aromatic hydrocarbon is benzene.

13. A process according to claim 10 in which said period of time is in the range of 0.25 to 0.4 hour.

14. In a process for producing heavy alkylate, the step which comprises reacting $C_6$ to $C_{21}$ olefinic polymer in the presence of an aromatic hydrocarbon selected from the group consisting of benzene, toluene and short chain alkyl substituted benzenes in which the short chain alkyl group contains up to 4 carbon atoms in a reaction zone wherein the aromatic to polymer volume ratio is maintained in the range of 0.5:1 to 2.0:1 in the presence of $AlCl_3$ employed in the range of 2 to 5 wt. percent based on olefinic polymer feed with HCl gas being employed as a reaction promoter in the range of 0.05 to 0.25 wt. percent based on olefinic polymer feed for a period of time in the range of 0.1 to 1.0 hour to promote the formation of higher molecular weight polymers of said olefinic polymer.

15. A process according to claim 14 in which said olefinic polymer has 10 to 13 carbon atoms per molecule.

16. A process according to claim 14 in which said aromatic hydrocarbon is benzene.

17. A process according to claim 14 in which said period of time is within the range of 0.25 to 0.4 hour.

References Cited in the file of this patent

UNITED STATES PATENTS 2,519,099    Bailey et al. _____ Aug. 15, 1950

FOREIGN PATENTS 724,127    Great Britain _____ Feb. 16, 1955